US008281388B1

(12) United States Patent
Sobel et al.

(10) Patent No.: US 8,281,388 B1
(45) Date of Patent: Oct. 2, 2012

(54) HARDWARE SECURED PORTABLE STORAGE

(75) Inventors: William E. Sobel, Jamul, CA (US); Brian Hernacki, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 686 days.

(21) Appl. No.: 12/163,690

(22) Filed: Jun. 27, 2008

(51) Int. Cl.
*G06F 21/00* (2006.01)
(52) U.S. Cl. .............................. 726/16; 726/34; 713/194
(58) Field of Classification Search .................. 380/263, 380/264; 705/55; 713/172, 182, 185, 193, 713/194; 726/1, 2, 16–21, 26–30
See application file for complete search history.

(56) References Cited

U.S. PATENT DOCUMENTS

| | | | |
|---|---|---|---|
| 6,477,530 B1 * | 11/2002 | Omata et al. | 1/1 |
| 2002/0154781 A1 * | 10/2002 | Sowa et al. | 380/278 |
| 2004/0039930 A1 * | 2/2004 | Ohmori et al. | 713/193 |
| 2008/0047024 A1 | 2/2008 | Frank et al. | |
| 2008/0155271 A1 * | 6/2008 | Barck et al. | 713/189 |
| 2008/0256356 A1 * | 10/2008 | Iyengar et al. | 713/155 |

OTHER PUBLICATIONS

RSA, RSA SecurID SID800 Hardware Authenticator, 2005, RSA, pp. 1 and 2.*
RSA SecurID® SID800 Hardware Authenticator; copyright 2005-2007 RSA Security Inc; http://www.rsa.com/products/securid/datasheets/SID800_DS_0507.pdf.
TCG Specification Architecture Overview, Specification Revision 1.4, Aug. 2, 2007.
TCG Storage Architecture Core Specification, Specification Version 1.0, Revision .9—draft—May 24, 2007.
BlackDog Developer's Guide; 2005; retrieved on Jun. 18, 2008 from website: http://www.projectblackdog.com.

* cited by examiner

*Primary Examiner* — Gilberto Barron, Jr.
*Assistant Examiner* — Malcolm Cribbs
(74) *Attorney, Agent, or Firm* — Brill Law Office; Jeffrey Brill

(57) ABSTRACT

A portable storage device contains a real time clock, an onboard power source and secure storage. These components enable the device to securely store data and control access thereto. A secret key can be maintained in secure storage, such that access to the device can be denied to external systems that do not have a matching key. A log detailing connections can also be maintained in secure storage, such that device activity can be accurately documented, and made available in a trusted manner to a management system. Furthermore, the onboard real time clock allows stored data to be encrypted and decrypted in conjunction with specified time periods, such that a session key is destroyed after a time out, or is not made available until a given period of time has transpired.

19 Claims, 3 Drawing Sheets

HARDWARE SECURED PORTABLE STORAGE

TECHNICAL FIELD

This invention pertains generally to portable storage devices, and more specifically to a portable storage device with a real time clock and an onboard power source.

BACKGROUND

The use of portable storage devices has become widespread. Storage technology such as flash memory and hard drives have become inexpensive and very small in size, thus enabling the development of portable storage devices that can be used to easily move large amounts of data between computers. These devices create serious security threats, as their small size makes them subject to loss and theft. Because highly confidential and sensitive data such as company trade secrets or personal information concerning employees can be stored on such devices, unauthorized access can create very severe security, business and legal problems.

Portable storage devices exist today in which the stored data can be encrypted, such that the device cannot simply by plugged into any host and read. In some encryption protected devices, the actual encryption is executed by the portable device, typically at a hardware level. The user can decide what data to encrypt, and what to leave in the clear. Encrypting data on a portable storage device is an important security measure, but it is only effective to the extent it is used. Encrypting data has an overhead, and thus it not uncommon for users to leave sensitive information unencrypted.

Portable storage devices can also be password protected, such that a password must be entered to access the device when it is plugged into a host. However, simple password protection is subject to hacking, and if the data has been left unencrypted on the device, a sophisticated party can often gain access, the password protection scheme notwithstanding.

Host management systems also exist, which allow only portable storage devices which specific serial numbers to be attached. These systems allow an IT department or system administrator to prevent unknown portable devices from being connected to computers in an organization. For example, an employee could not bring a portable device from home and connect it to his work computer under such a system. As portable storage devices can spread viruses and other malware, being able to prevent unauthorized portable devices from being used within the organization is beneficial. However, these host management systems provide no additional security for authorized portable devices.

Thus, despite the security features discussed above, portable storage devices are still subject to unauthorized access of confidential information. It would be desirable to provide further security for portable devices to address this shortcoming.

SUMMARY

A portable storage device contains a real time clock, an onboard power source and secure storage. These components enable the device to securely store data and control access thereto. A secret key can be maintained in secure storage, such that access to the device can be denied to external systems that do not have a matching key. A log detailing connections can also be maintained in secure storage, such that device activity can be accurately documented, and made available in a trusted manner to a management system. Furthermore, the onboard real time clock allows stored data to be encrypted and decrypted in conjunction with specified time periods, such that a session key is destroyed after a time out, or is not made available until a given period of time has transpired.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
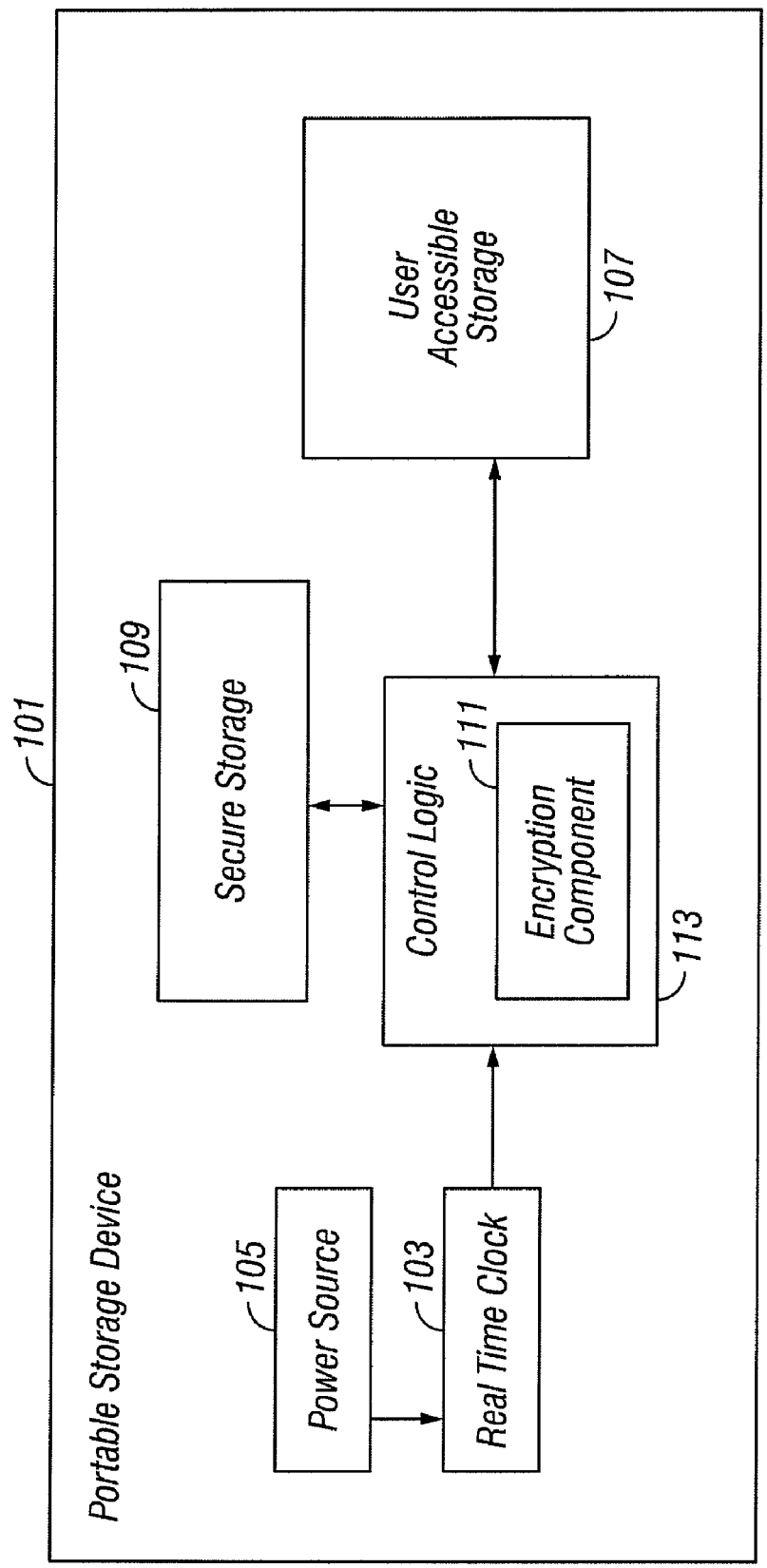
FIG. 1 is a block diagram illustrating a portable storage device with a real time clock and an onboard power source, according to some embodiments of the present invention.

FIG. 1 illustrates a portable storage device 101 with a real time clock 103 and an onboard power source 105, according to some embodiments of the present invention. As illustrated in FIG. 1, the portable storage device 101 contains a real time clock 103 embedded into the device 101. The real time clock 103 enables various functionalities described in detail below. The real time clock 103 can be in any suitable format, for example an integrated circuit, using, e.g., a crystal oscillator or the power line frequency.

This real time clock 103 is powered by an onboard power source 105, such that the real time clock 103 can operate for the working lifetime of the device 101 without requiring the device 101 to be connected to an external power source. The internal power source 105 typically comprises a rechargeable battery 105 (e.g., a lithium battery), which, given the current state of the art in small, rechargeable battery technology, can be expected to last many years without being replaced. In other embodiments, the power source 105 can be in others formats, for example a rechargeable super capacitor. Although the device 101 need not be plugged into an external power source for the clock 103 to operate, when the device 101 is plugged into a power port (e.g., USB), the battery 105 is automatically recharged. Thus, with reasonable and acceptable clock skew, such a battery 105 could easily last a decade, more than the expected, general lifetime of a portable storage device 101.

As illustrated, the portable device 101 contains user accessible storage 107. This can be in the form of flash memory, in which case the size of the storage 107 could be in the range of 64 megabytes to 16 gigabytes (these figures can be expected to grow rapidly in the future, as flash memory technology advances). The storage 107 can also comprise magnetic memory (e.g., a hard drive). The typical size range for portable hard drives is currently from 4 gigabytes to 250 gigabytes. As with flash storage, these numbers can be expected to increase over time. It is to be understood that all forms of portable storage technology are within the scope of the present invention, which is agnostic as to the specific underlying hardware instantiation used to implement this feature. Future storage technologies can be used as well.

The device 101 also includes a secure storage area 109, which is tamper resistant, and cannot be accessed by a user. This secure storage 109 is not included as a part of the user accessible storage 107 described above. Thus, formatting/wiping/deleting content from the device 101 does not clear the secure storage 109. The only way to manage the secure storage 109 is with a device key, as described below. In some embodiments, one portion of the secure storage 109 can be read by an authorized host, while another section of the secure storage (which typically holds encryption keys) can only be accessed by the device 101 itself. The secure storage can be used to provide a number of features, as described in detail below.

As illustrated, the device 101 also typically includes an encryption component 111 (e.g., hardware such as an encryption chip, or software or firmware configured to implement this functionality). The encryption component 111 can be used to encrypt both the internal device data and (configurable) user data, as described below.

Finally, the device also includes control logic 113 (implemented as software, firmware and/or hardware). The control logic 113 executes the above described functionality and enforces the above described rules (e.g., a user can access the general storage 107 but not the secure storage area 109), as well as the rules and functionality described below (e.g., controlling who can and cannot access what data at what time based on the output of the real time clock 103).

Figure 2:
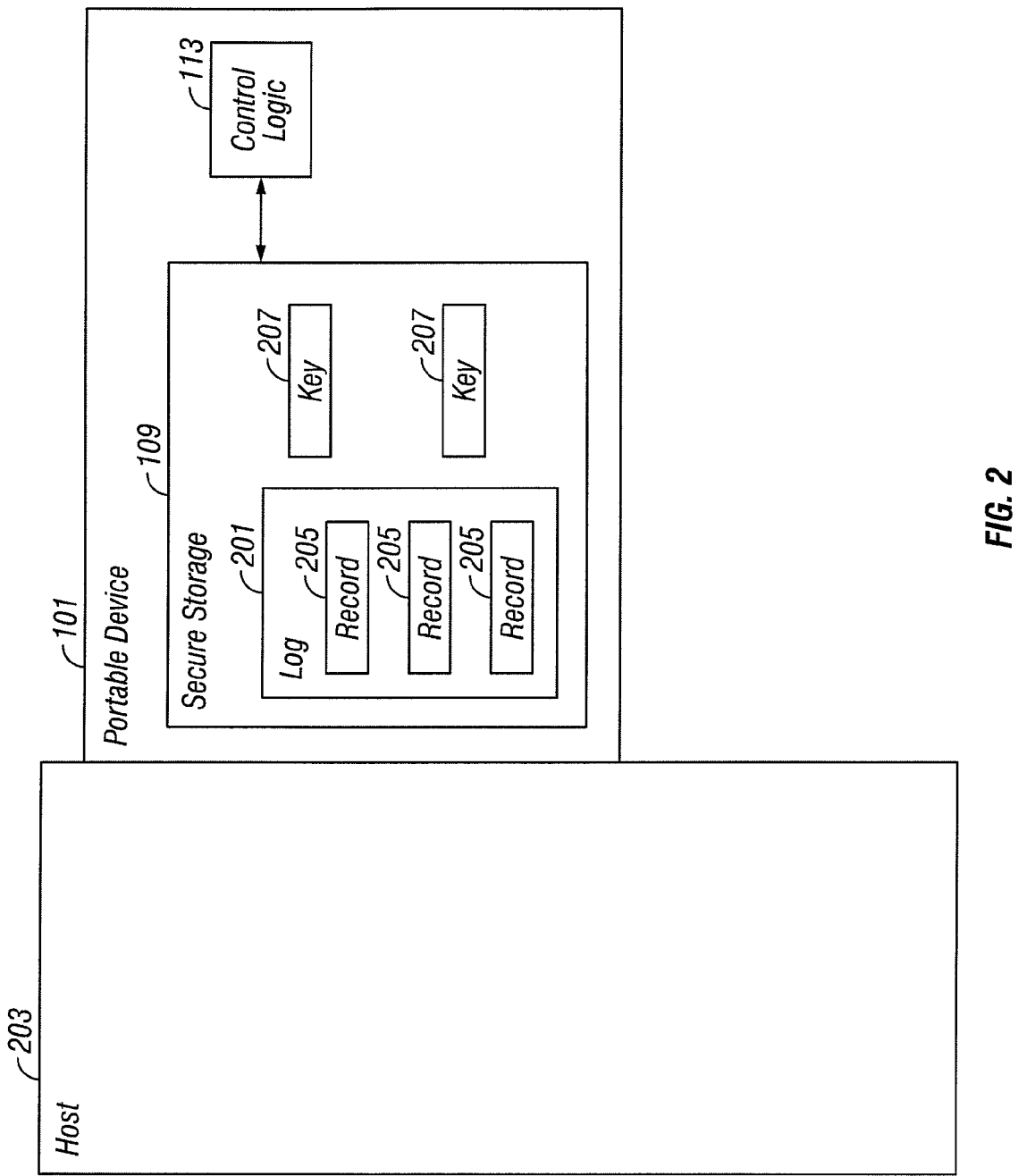
FIG. 2 is a block diagram illustrating some specific uses of a portable storage device with a real time clock and an onboard power source, according to some embodiments of the present invention.

Turning now to FIG. 2, the portable device 101 with its onboard real time clock 103 and power source 105 can be used to implement a number of desirable functionalities. In one embodiment, the control logic 113 is configured to maintain a log 201 in the portion of the tamper resistant secured storage 109 that can be accessed by an authorized host 203. Whenever the device 101 is connected to an external system 203, a record 205 detailing the connection is written to the secure, internal log 201. This type of logging, heretofore unavailable, is invaluable in determining if the device 101 was used improperly (either by its owner, or an unauthorized party, e.g., if it was temporarily misplaced, etc.).

The information in a log record 205 can include, for example, the time at which the device 101 was attached to an external system 203, duration of the attachment, amount of information read or written, identifiers (e.g. hashes, names, DLP markers) of objects read or written, and identifying details concerning the system 203 to which the device 101 was attached. This type of information can be passively gleaned by the control logic 113 from the external system 203, as such information is exposed through the connection to the host 203. The host 203 exposes such data to the portable device 101 through the hardware interface (e.g., USB) and/or or through interaction with a connectivity agent (e.g., a DLP agent). The time and duration aspects of this information can be provided by the onboard real time clock 103. The log 201 provides an investigator, IT department, device owner, etc., with read only documentation of events which in many scenarios can definitively prove whether or not the device 101 has been used in an improper manner.

As also illustrated in FIG. 2, the device 101 can be configured with one or more shared secret key(s) 207. These key(s) 207 are stored in the portion of the tamper resistant memory 109 that is only available to the device 101 itself. Once configured, such keys 207 cannot be altered by an unauthorized machine 203 or read externally. A shared secret key 207 can prevent connection of the device 101 to any unauthorized host 203. Specifically, the device 101 is configured so as to only connect to hosts 203 that provide a matching key 207 during the initialization process, when the device 101 is plugged into a host 203. The authorized host(s) 203 ideally also protect their key(s) 207 in secure storage 109. In this scenario, the device 101 simply fails to function on any unknown host 203 that does not provide a matching key 207. This allows an IT department, system administrator, device owner, etc. to configure the portable device 101 such that it can be used by approved machines 203, e.g., within an organization, but cannot used on non-approved devices 203, e.g., if stolen or misused by an employee. This secure attachment functionality need not replace data encryption and the use of passwords to access stored data, but instead can provide an additional protection capability that allows management to control where the device 101 is used, while still allowing the user to control what data is encrypted and what data is in the clear, within the approved context of a set of allowed hosts 203.

Figure 3A:
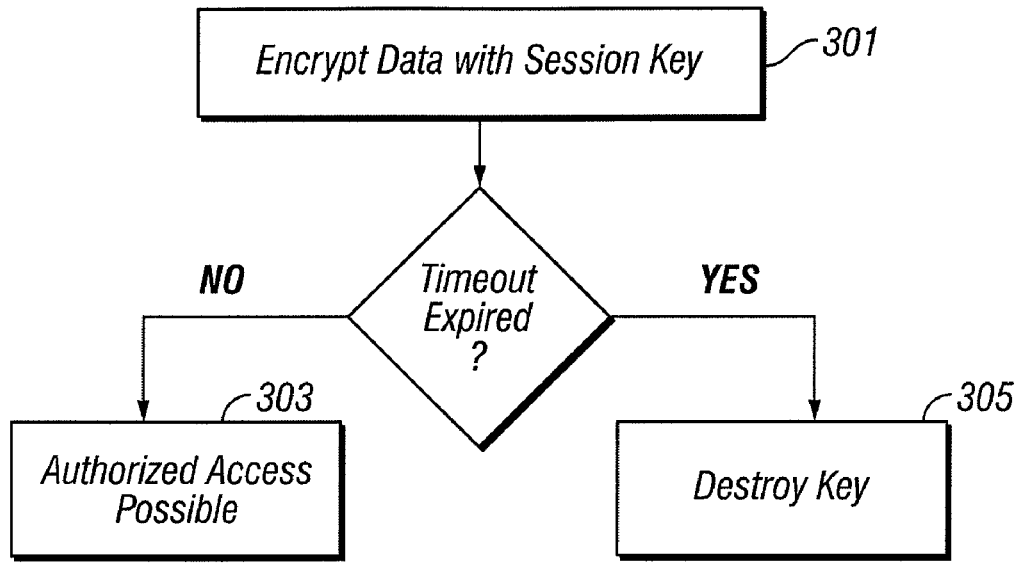
FIGS. 3A and 3B are flowcharts illustrating steps for using a portable storage device with a real time clock to provide timed encryption, according to some embodiments of the present invention.

As illustrated in FIG. 3A, the device 101 can also encrypt 301 data with a session key 207 that is stored in the secure memory 109 with a timeout. Prior to the expiration of the timeout, the session key 207 is intact, and thus authorized access 303 of the data is possible. At the expiration of the timeout, the key 207 is overwritten 305. Thus, with the key 207 destroyed, the data is effectively unrecoverable. Overwriting just a key 207 is a fairly low power operation compared to destroying the data itself. This keeps the power usage within a lower power profile, which is highly desirable for a portable device 101. It is to be understood that the onboard real time clock 103 enables this timed encryption.

Figure 3B:
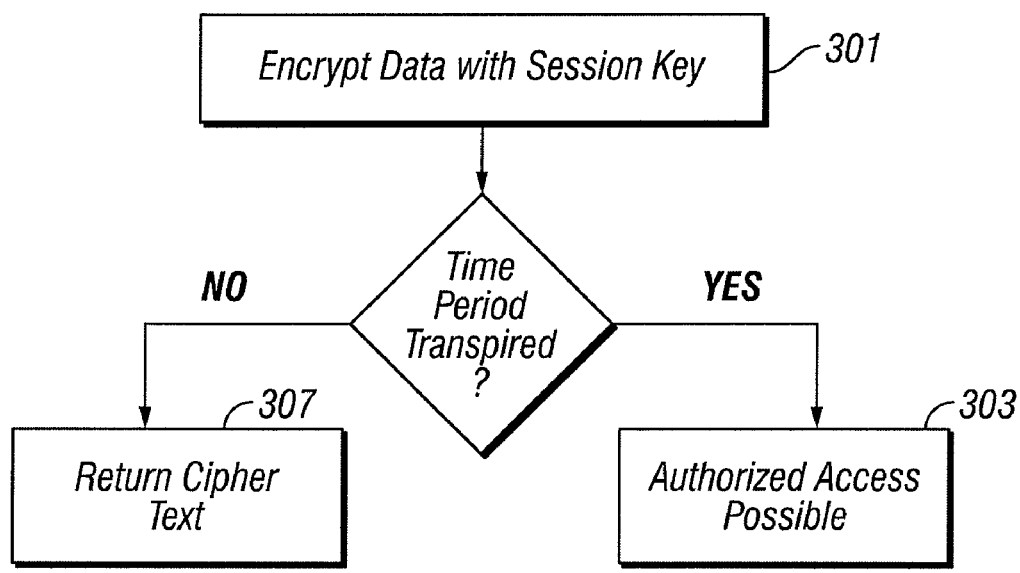

As illustrated in FIG. 3B, the device 101 can also provide secure, timed allowance of data access. In this scenario, the device 101 encrypts 303 data with a secure session key 207, but instead of having a timeout period, the key 207 cannot be retrieved until a given time period has passed. An attempt to access the data prior to the expiration of this time period simply returns 307 the cipher text. Once the time period has elapsed, the session key becomes available, and thus authorized access 303 of the data is possible. This functionality can be used, for example, in various agreed disclosure and escrow operations.

It is to be understood that although various components are illustrated and described above as separate entities, each illustrated component represents collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media.

Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A portable storage device configured to securely store and control access to data, the portable storage device comprising:
    a real time clock, configured to track current time;
    an onboard power source coupled to the real time clock, configured to provide the real time clock with power;
    control logic, configured to enforce device rules, execute device functionality, and detect connections of the device to an external system, and for each detected connection, to initiate a write of a log record concerning the connection to a portion of a secure storage area, the log record comprising a current time from the real time clock and a determined identification of the external system, wherein the log record can be read from but not written to by an authorized host;
    a user accessible storage area, configured such that that data can be written to and read from the user accessible storage area, the user accessible storage area being communicatively coupled to the control logic; and
    a secure storage area, configured to be accessible to elements external to the device only by using a device key, the secure storage area being communicatively coupled to the control logic.

2. The device of claim 1 wherein the onboard power source comprises at least one element from a group of elements consisting of:
    a rechargeable battery;
    a lithium battery; and
    a rechargeable supercapacitor.

3. The device of claim 1 wherein the user accessible storage area comprises at least one element from a group of elements consisting of:
    flash memory; and
    magnetic memory.

4. The device of claim 1 wherein the secure storage area further comprises:
    a portion of the secure storage area configured such that it can be read from but not written to by an authorized host; and
    a portion of the secure storage area configured such that it can be accessed only by the control logic of the device.

5. The device of claim 4 further comprising:
    at least one shared secret key stored in the portion of the secure storage area configured such that it can be accessed only by the control logic of the device; and
    wherein the control logic is further configured to detect all connections of the device to any external system, and for each detected connection, only to allow the external system to read from or write to the device responsive to the external system providing a matching key.

6. The device of claim 1 wherein the control logic further comprises:
    an encryption component, configured to use at least one key to encrypt and decrypt stored data.

7. The device of claim 6 wherein:
    the encryption component is further configured to encrypt data with a secure session key and a timeout, such that the session key is destroyed when the timeout expires.

8. The device of claim 6 wherein:
    the encryption component is further configured to encrypt data with a secure session key configured such that the session key is not accessible until after a specific period of time has transpired.

9. A method implemented by a portable storage device that comprises a real time clock, an onboard power source and a secure storage area, the method comprising the steps of:
    detecting connections of the device to external systems including a current time of a connection from the real time clock and a determined identification of the connection from the external system;
    for each detected connection, initiating a write of a log record concerning the detected connection to a portion of the secure storage area configured such that it can be read from but not written to by an authorized host, the log record comprising a current time from the real time clock and a determined identification of the external system.

10. The method of claim 9 further comprising:
    for each detected connection, gleaning information concerning the connection to the external system from the connection to the external system;
    writing the gleaned information to the record log; and
    wherein the gleaned information includes at least one type of data from a group of types consisting of: the time at which the device was connected to the external system, a duration of the attachment, an amount of information read from the device, an amount of information written to the device, at least one identifier of at least one object read from the device, at least one identifier of at least one object written to the device, and identifying information concerning the external system.

11. The method of claim 10 wherein gleaning information from the connection to the external system further comprises:
    gleaning information from a hardware interface.

12. The method of claim 10 wherein gleaning information from the connection to the external system further comprises:
    gleaning information from a connectivity agent.

13. A method implemented by a portable storage device that comprises a real time clock, an onboard power source and a secure storage area, the method comprising the steps of:
- storing at least one shared secret key stored in a portion of the secure storage area configured such that it can be accessed only by a control logic of the device;
- detecting connections of the device to external systems;
- for each detected connection, determining whether the external system provides a matching key, and initiating a write of a log record concerning the detected connection to a portion of the secure storage area configured such that it can be read from but not written to by an authorized host, the log record comprising a current time from the real time clock and a determined identification of the external system; and
- responsive to results of the determining step, controlling access by the external system to the device.

14. The method of claim 13 further comprising:
responsive to the external system providing a matching key, allowing the external system to access the device.

15. The method of claim 13 further comprising:
responsive to the external system not providing a matching key, preventing the external system from accessing the device.

16. The method of claim 13 further comprising:
encrypting stored data with a session key;
storing a timeout;
controlling access to the encrypted data in conjunction with the timeout.

17. The method of claim 16 further comprising:
detecting the expiration of the timeout; and
deleting the session key.

18. The method of claim 13 further comprising:
encrypting stored data with a session key;
storing a time period;
controlling access to the encrypted data in conjunction with the time period.

19. The method of claim 18 further comprising:
not making the session key available until after the time period has transpired.

* * * * *